United States Patent
Kaushik et al.

(10) Patent No.: US 10,657,245 B2
(45) Date of Patent: May 19, 2020

(54) DYNAMICALLY CONTROLLING ACCESS TO DEVICES

(71) Applicant: Wyse Technology L.L.C., Santa Clara, CA (US)

(72) Inventors: Puneet Kaushik, Fremont, CA (US); Salil Joshi, Fremont, CA (US)

(73) Assignee: Wyse Technology L.L.C., Santa Clara, CA (US)

(*) Notice: Subject to any disclaimer, the term of this patent is extended or adjusted under 35 U.S.C. 154(b) by 270 days.

(21) Appl. No.: 15/458,249

(22) Filed: Mar. 14, 2017

(65) Prior Publication Data

US 2018/0268126 A1 Sep. 20, 2018

(51) Int. Cl.
| | | |
|---|---|---|
| G06F 21/44 | (2013.01) | |
| G06F 13/366 | (2006.01) | |
| G06F 13/40 | (2006.01) | |
| G06F 9/4401 | (2018.01) | |
| G06F 21/85 | (2013.01) | |

(Continued)

(52) U.S. Cl.
CPC .......... *G06F 21/44* (2013.01); *G06F 9/4411* (2013.01); *G06F 13/366* (2013.01); *G06F 13/4072* (2013.01); *G06F 21/57* (2013.01); *G06F 21/606* (2013.01); *G06F 21/70* (2013.01); *G06F 21/85* (2013.01); *H04L 63/0272* (2013.01)

(58) Field of Classification Search
CPC .......... G06F 21/44; G06F 21/57; G06F 21/70; G06F 9/4411
See application file for complete search history.

(56) References Cited

U.S. PATENT DOCUMENTS

| | | | | |
|---|---|---|---|---|
| 6,549,934 B1 * | 4/2003 | Peterson | ................. | H04L 49/90 709/203 |
| 6,694,317 B1 * | 2/2004 | Stearns | ............... | G06F 16/1824 709/227 |

(Continued)

OTHER PUBLICATIONS

Li, Shaobo, et al. "The design and implementation of removable storage device monitoring system based on WDM filter driver." 2010 International Symposium on Intelligence Information Processing and Trusted Computing. IEEE, (2010): pp. 450-453. (Year: 2010).*

(Continued)

*Primary Examiner* — Karl L Schmidt
(74) *Attorney, Agent, or Firm* — Kirton McConkie; Brian Tucker

(57) ABSTRACT

Access to devices can be controlled dynamically. A device control driver can function as an upper filter driver so that it can intercept I/O requests that target a particular device. The device control driver can be configured to communicate with a device control server to dynamically determine whether the current user is allowed to access the particular device. The device control server can employ policy or administrator input to determine whether access should be allowed and can then notify the device control driver accordingly. When access is granted, the device control driver can pass I/O requests down the device driver stack. Otherwise, the device control driver can block the I/O requests. Also, when access is granted, the device control server can specify a permission expiration time after which the device control driver should again resume blocking I/O requests.

20 Claims, 9 Drawing Sheets

(51) Int. Cl.
*G06F 21/60* (2013.01)
*H04L 29/06* (2006.01)
*G06F 21/70* (2013.01)
*G06F 21/57* (2013.01)

(56) References Cited

U.S. PATENT DOCUMENTS

| | | | | |
|---|---|---|---|---|
| 7,103,783 | B1* | 9/2006 | Friedman | G06F 21/6281 |
| | | | | 709/223 |
| 7,207,041 | B2* | 4/2007 | Elson | G06F 9/5011 |
| | | | | 718/1 |
| 7,810,089 | B2* | 10/2010 | Sundarrajan | G06F 8/61 |
| | | | | 717/174 |
| 7,865,910 | B2* | 1/2011 | Durojaiye | G06F 9/4411 |
| | | | | 719/322 |
| 8,122,149 | B2* | 2/2012 | Ingle | G06Q 10/00 |
| | | | | 709/223 |
| 8,353,044 | B1* | 1/2013 | Jones | H04L 67/34 |
| | | | | 718/1 |
| 8,484,327 | B2* | 7/2013 | Werner | G06F 13/387 |
| | | | | 709/223 |
| 10,223,178 | B2* | 3/2019 | Vajravel | G06F 13/00 |
| 2003/0120822 | A1* | 6/2003 | Langrind | H04L 29/1232 |
| | | | | 709/251 |
| 2006/0143716 | A1* | 6/2006 | Ikemoto | G06F 21/57 |
| | | | | 726/27 |
| 2006/0161617 | A1* | 7/2006 | Zhong | H04L 67/38 |
| | | | | 709/203 |
| 2006/0294105 | A1* | 12/2006 | Rosenan | G06F 9/445 |
| 2007/0046562 | A1* | 3/2007 | Polivy | G06F 8/20 |
| | | | | 345/1.2 |
| 2007/0061477 | A1* | 3/2007 | Stoyanov | G06F 9/4411 |
| | | | | 709/230 |
| 2007/0143827 | A1* | 6/2007 | Nicodemus | G06F 21/6218 |
| | | | | 726/2 |
| 2007/0233842 | A1* | 10/2007 | Roberts | G06F 21/552 |
| | | | | 709/223 |
| 2007/0288623 | A1* | 12/2007 | Kato | G06F 21/33 |
| | | | | 709/223 |
| 2009/0036111 | A1* | 2/2009 | Danford | H04L 41/0893 |
| | | | | 455/419 |
| 2009/0094387 | A1* | 4/2009 | Bunger | G06F 3/038 |
| | | | | 710/11 |
| 2010/0199325 | A1* | 8/2010 | Raleigh | G06F 21/53 |
| | | | | 726/3 |
| 2010/0325736 | A1* | 12/2010 | Sadovsky | H04L 63/101 |
| | | | | 726/27 |
| 2011/0035758 | A1* | 2/2011 | Stoyanov | G06F 9/4411 |
| | | | | 719/324 |
| 2011/0289282 | A1* | 11/2011 | Obr | G06F 9/4411 |
| | | | | 711/154 |
| 2013/0014221 | A1* | 1/2013 | Moore | G06F 21/85 |
| | | | | 726/3 |
| 2013/0191601 | A1* | 7/2013 | Peterson | G06F 12/0868 |
| | | | | 711/137 |
| 2013/0198311 | A1* | 8/2013 | Tamir | G06F 15/167 |
| | | | | 709/212 |
| 2014/0259114 | A1* | 9/2014 | Jankowski | H04L 63/08 |
| | | | | 726/4 |
| 2015/0040181 | A1* | 2/2015 | Cook | G06F 21/6281 |
| | | | | 726/1 |
| 2015/0220737 | A1* | 8/2015 | Rothman | G06F 21/572 |
| | | | | 726/1 |
| 2016/0036818 | A1* | 2/2016 | Patesaria | H04L 63/102 |
| | | | | 726/3 |
| 2016/0125205 | A1* | 5/2016 | Vajravel | G06F 13/4095 |
| | | | | 710/108 |
| 2016/0306966 | A1* | 10/2016 | Srivastava | G06F 21/31 |
| 2017/0264649 | A1* | 9/2017 | Sonar | G06F 13/4282 |
| 2018/0300469 | A1* | 10/2018 | Sarfraz | G06F 21/44 |

OTHER PUBLICATIONS

C. Dsouza, G. Ahn and M. Taguinod, "Policy-driven security management for fog computing: Preliminary framework and a case study," Proceedings of the 2014 IEEE 15th International Conference on Information Reuse and Integration (IEEE IRI 2014), Redwood City, CA, 2014, pp. 16-23. (Year: 2014).*

Wang, Yifei, et al. "Connpac: Enforce component-level access control in Android." Proceedings of the 4th ACM Conference on Data and Application Security and Privacy. (2014): pp. 25-36. (Year: 2014).*

* cited by examiner

DYNAMICALLY CONTROLLING ACCESS TO DEVICES

CROSS-REFERENCE TO RELATED APPLICATIONS

N/A

BACKGROUND

To enable access to an I/O device, the operating system loads a device driver stack. This is true whether the I/O device is an onboard device or an externally connected device. Typically, the operating system performs a plug-and-play process to automatically detect when a device has been connected and to load the appropriate device drivers into the stack. Once the device driver stack is created for a particular device, I/O requests targeting the device will be passed through the stack thereby allowing the drivers to handle the request appropriately.

In some cases, it may be desirable to prevent a user from accessing a particular device or a particular type of device. For example, an administrator may block users from accessing mass storage devices (e.g., USB flash drives) or webcams that are connected to or built into their computing devices. There are currently various techniques that can be employed to accomplish this type of blocking. For example, a USB port could be disabled to prevent any type of device from being connected to the computing device via the USB port. Alternatively, a computing device could be configured to block the loading of a device driver stack when a particular type of device is connected. Both of these examples represent all-or-nothing approaches to blocking access to devices. For example, if the computing device is configured to not load a device driver stack for a webcam, the webcam will remain inaccessible until the computing device is reconfigured (and possibly rebooted) to allow such access. Similarly, if the computing device is configured to load a device driver stack for the webcam, the webcam will remain accessible until the computing device is again reconfigured. There are currently no techniques for dynamically controlling access to a device.

BRIEF SUMMARY

The present invention extends to methods, systems, and computer program products for dynamically controlling access to devices. A device control driver can be registered with the operating system to be loaded into the device driver stack for a particular type of device. The device control driver can function as an upper filter driver so that it can intercept I/O requests that target a particular device. The device control driver can be configured to communicate with a device control server to dynamically determine whether the current user is allowed to access the particular device. The device control server can employ policy or administrator input to determine whether access should be allowed and can then notify the device control driver accordingly.

When access is granted, the device control driver can pass I/O requests down the device driver stack. Otherwise, the device control driver can block the I/O requests. Also, when access is granted, the device control server can specify a permission expiration time after which the device control driver should again resume blocking I/O requests. The device control driver may also be configured to periodically poll the device control server to determine whether access permissions to the device have changed. In this way, access to a device can be dynamically controlled without requiring configuration changes to the computing device and without requiring the user to reboot or log off. Instead, access can be granted at a particular time and for a specified duration and can also be quickly revoked.

In one embodiment, the present invention is implemented as a method for dynamically controlling access to a device. A device control driver that has been loaded on a device driver stack of a device can identify information about the device and send the information to a device control server. The device control driver can then receive, from the device control server, an indication of whether access to the device should be allowed. When the indication defines that access to the device is allowed, the device control driver allows I/O requests that target the device. When the indication defines that access to the device is not allowed, the device control driver blocks I/O requests that target the device.

In another embodiment, the present invention is implemented as a method for dynamically controlling access to a device. A device control server can receive information about a device that is connected to or onboard a computing device. The information is received from a device control driver that is loaded on a device driver stack for the device. Based on the received information, the device control server identifies a policy governing access permissions to the device and evaluates the policy to determine whether access to the device should be allowed on the computing device. When the policy indicates that access should be allowed, the device control server sends a notification to the device control driver that instructs the device control driver to allow access to the device. When the policy indicates that access should not be allowed, the device control server sends a notification to the device control driver that instructs the device control driver to block access to the device.

In another embodiment, the present invention is implemented as computer storage media storing computer-executable instructions which when executed on one or more processors implement a method for controlling access to a device. The method includes: identifying, by a device control driver that has been loaded on a device driver stack of a device, information about the device; sending, to a device control server, the information about the device; employing, by the device control server, the information about the device to identify a policy governing access to the device; evaluating, by the device control server, the policy to determine that access to the device should be allowed; sending, by the device control server, a notification to the device control driver that instructs the device control driver to allow access to the device; and in response to the notification, allowing I/O requests targeting the device to be passed down the device driver stack to the device.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which.

DETAILED DESCRIPTION

Figure 1B:
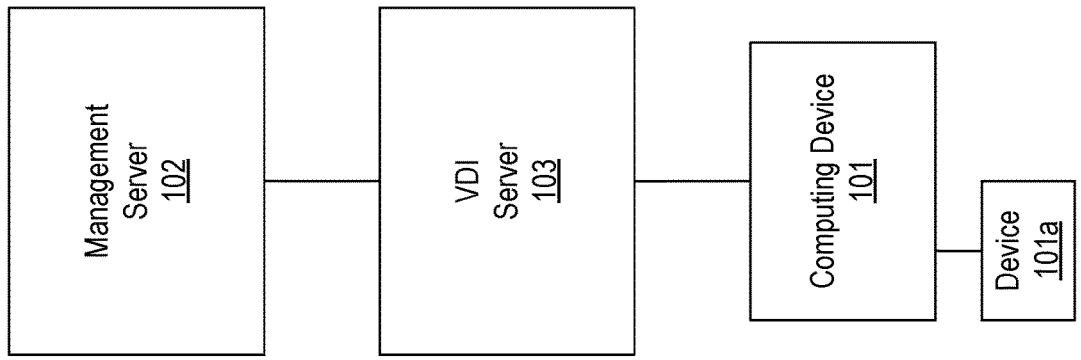
FIGS. 1A and 1B each illustrate an example computing environment in which the present invention can be implemented.
Figure 1A:
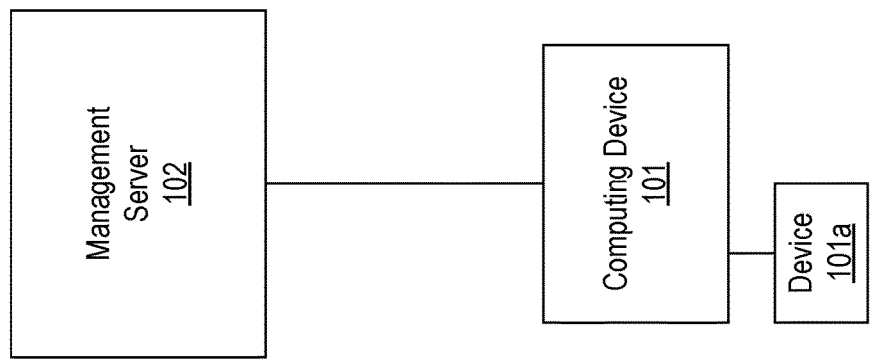

FIGS. 1A and 1B each illustrate an example computing environment 100a, 100b respectively in which the present invention can be implemented. Computing environment 100a includes a computing device 101 to which a device 101a is connected (or which may include device 101a as an onboard device) and a management server 102 with which computing device 101 is connected via a network. Computing device 101 can represent any type of computing device that is configured to load a device driver stack to allow device 101a to be accessed. For example, computing device 101 can represent a desktop computer, a laptop computer, a tablet, a smart phone, a smart display, etc. Device 101a can represent any type of device that is accessed via a device driver stack. For example, device 101a can represent a USB mass storage device, a camera, a printer, headphones, a microphone, a keyboard, a mouse, etc.

Computing environment 100a is intended to represent non-VDI environments. In other words, in computing environment 100a, a user will be logged in to a local session on computing device 101. In contrast, in computing environment 100b, computing device 101 functions as a client terminal for establishing a remote session on VDI server 103. For example, computing device 101 may include a remote display protocol client that implements a remote display protocol with a remote display service executing on VDI server 103. In such a case, device 101a can be connected to computing device 101 (or be an onboard device) but redirected to VDI server 103 to enable access to device 101a within the remote session. As one of skill in the art would understand how device redirection can be implemented, a detailed discussion will not be provided herein. Suffice it to say that when device 101a is redirected to VDI server 103, a device driver stack (or at least a partial device driver stack) can be loaded on VDI server 103 in much the same way as a device driver stack would be loaded on computing device 101 in the non-VDI environment depicted in FIG. 1A. VDI server 103 can be connected to management server 102 via a network connection. In some embodiments, management server 102 and VDI server 103 may represent the same physical device (e.g., management server 102 and VDI server 103 could be different virtual machines executing on the same hardware). Because the present invention will be implemented in the same manner in both computing environments 100a and 100b and for ease of illustration, the present invention will be described in the context of computing environment 100a.

Figure 2:
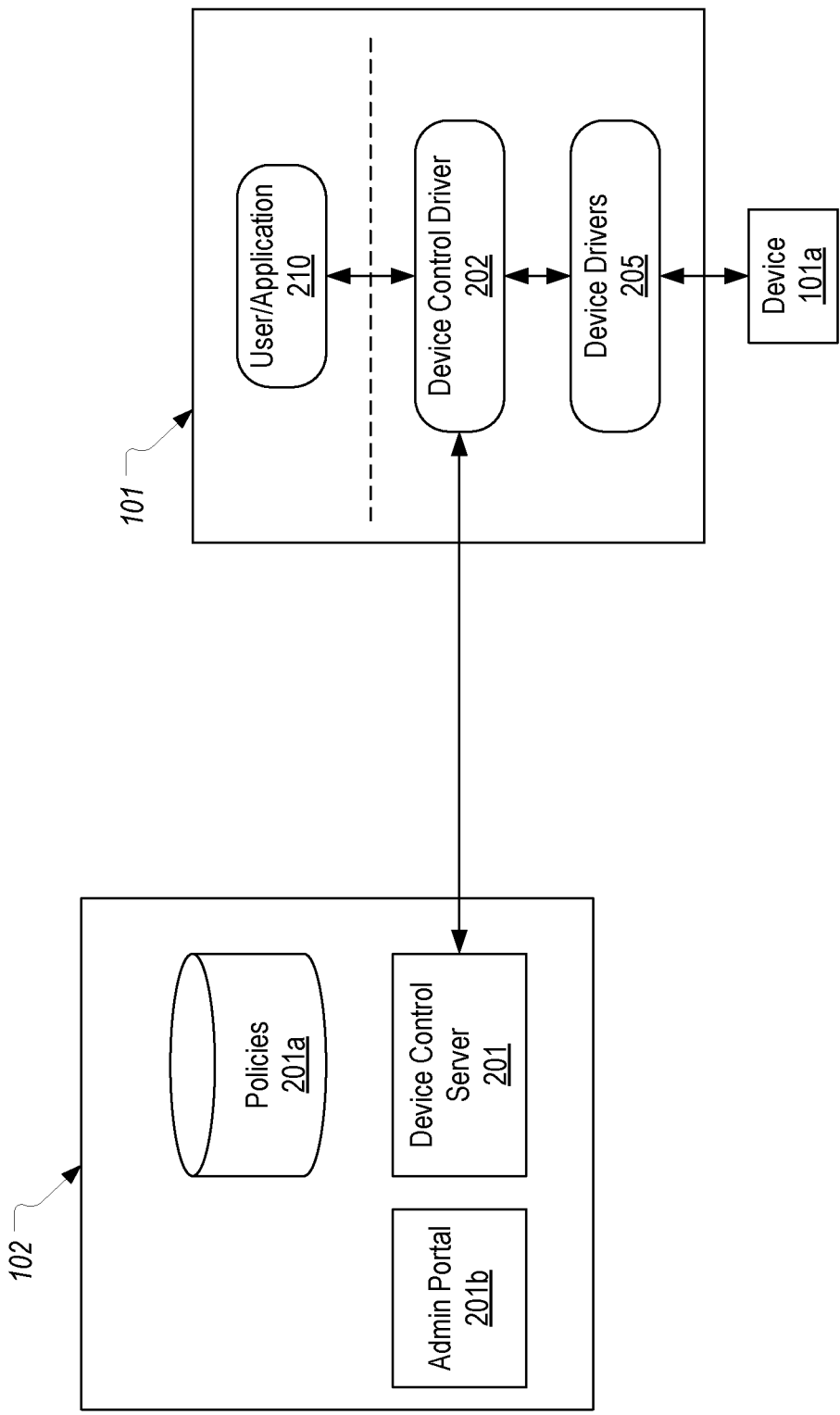
FIG. 2 illustrates various components that can be employed to implement embodiments of the present invention.

FIG. 2 illustrates various components of computing device 101 and management server 102 which can be employed in embodiments of the present invention. As was described in the background, when device 101a is connected to computing device 101 (or equally, when device 101a is an onboard device), the operating system will load device drivers 205. For example, in a Windows environment, device drivers 205 can represent one or more physical device objects (PDOs) and functional device objects (FDOs). In a VDI environment, at least some of device drivers 205 will be loaded on VDI server 103, and therefore, FIG. 2 can also generally represent such environments (in which case device 101a as depicted in FIG. 2 would be a virtual device).

When it is desired to dynamically control access to device 101a (or more likely, to the type of device that device 101a is), device control driver 202 can be registered with the operating system to be loaded whenever device 101a is connected. For example, device control driver 202 can be identified in an INF file pertaining to a particular type of device. Preferably, device control driver 202 can be registered as an upper filter driver so that it will be loaded on top of device drivers 205. This will ensure that device control driver 202 will intercept I/O requests targeting device 101a before they are passed onto device drivers 205. As is known, this can be accomplished when device control driver 202's AddDevice routine is called during the enumeration of device 101a as part of the plug-and-play process. Accordingly, as is shown in FIG. 2, whenever a user or application 210 generates an I/O request that targets device 101a, device control driver 202 will be passed the I/O request and have the opportunity to allow or block it.

An instance of device control driver 202 can be registered to be loaded for many different types of devices at various levels of granularity. For example, device control driver 202 could be registered as a device-specific filter driver or as a class filter driver. However, how device control driver 202 is registered is not essential to the invention. Of importance is the fact that device control driver 202 can be loaded on the device driver stack of any device for which dynamic access control is desired.

FIG. 2 also shows that management server 102 includes a device control server 201 that is configured to communicate with device control driver 202 for the purpose of dynamically specifying to device control driver 202 whether access to device 101a should be allowed. Device control server 201 and device control driver 202 can communicate while the device driver stack for device 101a is loaded to dynamically control whether access is permitted at any given time. More particularly, based on information provided by device control server 201, device control driver 202 can determine whether a particular I/O request should be blocked or passed down to device drivers 205.

Whether device control server 201 specifies that access to device 101a is permitted can be based on policies 201a. Policies 201a can be particular to a number of different criteria including a user that is attempting the access, a group to which the user belongs, a device class or id of device 101a, whether device 101a is a simple or composite device, whether device 101a is an onboard or connected device, a time at which the access is attempted, a location of the access, etc. Such criteria can be determined directly by device control server 201 (e.g., a time of access) or reported by device control driver 202 (e.g., the user or device characteristics).

By way of overview, device control driver 202 can be configured to contact device control server 201 to determine whether access to device 101a should be allowed. Device control server 201 can access policies 201a using appropriate criteria to determine whether access should be permitted and for how long. Device control server 201 can then relay the results of this determination to device control driver 202 which will in turn allow or block access accordingly.

In some embodiments, device control driver 202 can be configured to periodically poll device control server 201 (e.g., every 5 minutes) to determine whether the access permissions have changed. For example, management server 102 can provide an admin portal 201b to allow an administrator to monitor and dynamically manage the access permissions for any device being managed by an instance of device control driver 202 (e.g., by updating policies 201a and/or by directly specifying that access permissions to a particular device should be updated). Therefore, policies 201a can be employed to automate the process of dynamically controlling access to device 101a while admin portal 201b can retain the ability to manually control or update access in a dynamic manner.

FIGS. 3A-3E illustrate an example sequence of steps that can be performed to dynamically control access to device 101a. For purposes of this example, it will be assumed that device 101a has been connected (or if device 101a is an onboard device, that computing device 101 has been booted), and therefore, device control driver 202 has been loaded onto the device driver stack for device 101a.

Figure 3A:
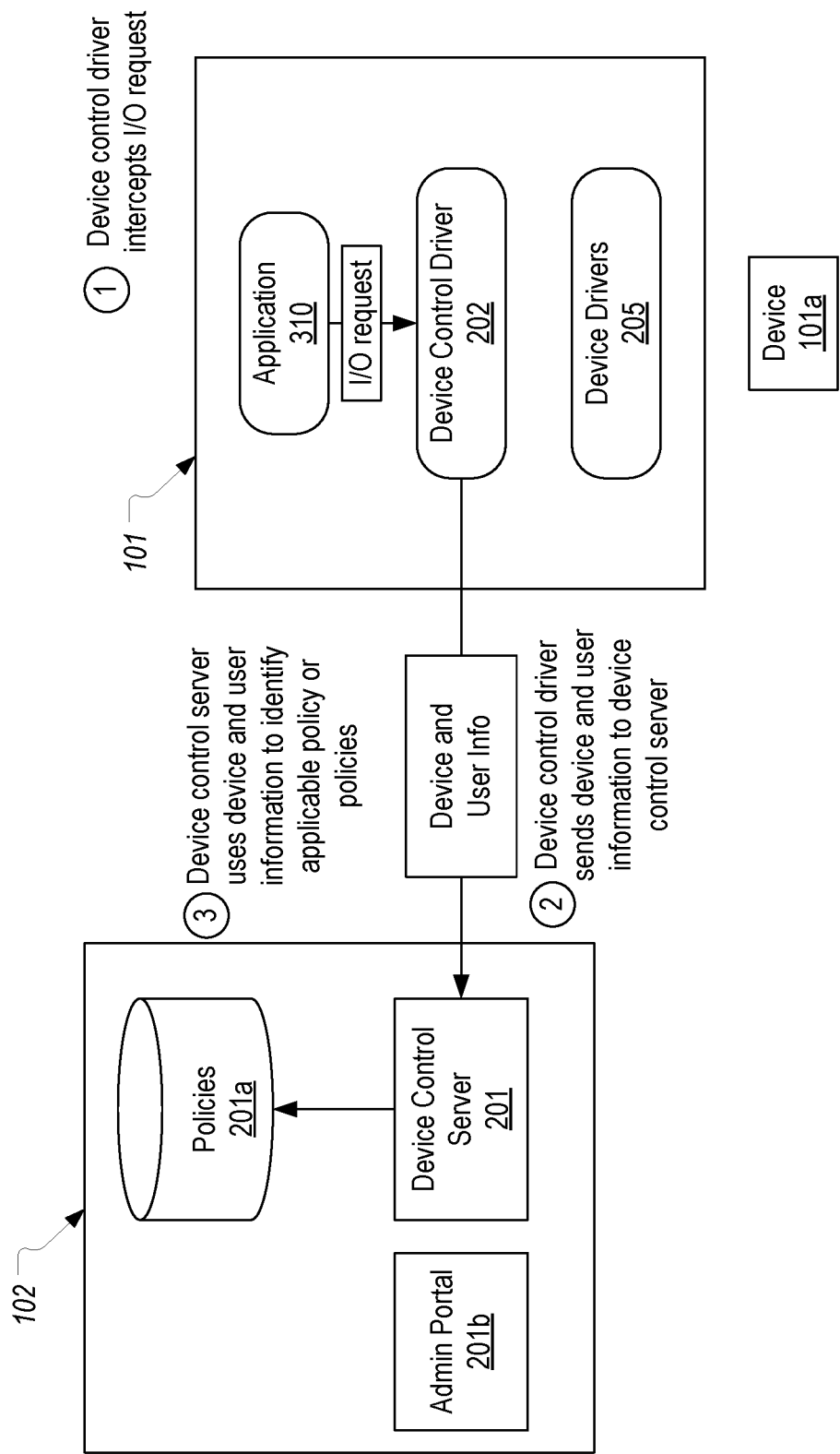
FIGS. 3A-3E illustrate an example sequence of steps that can be performed to dynamically control access to a device.

In step 1 shown in FIG. 3A, device control driver 202 intercepts an I/O request generated by application 310 that targets device 101a. At this point, it will be assumed that device control driver 202 has not yet communicated with device control server 201 for the purpose of determining whether access to device 101a should be allowed at that given time. Therefore, prior to allowing or blocking the I/O request, device control driver 202 can communicate with device control server 201 to dynamically determine whether access should be allowed. In particular, in step 2, device control driver 202 can send user and/or device information to device control server 201 (e.g., using the Winsock Kernel network programming interface or via a user mode agent). As an example, device control driver 202 could determine the device type (e.g., in the form of USB descriptors) of device 101a (e.g., by querying device 101a directly or accessing cached information that was previously retrieved from device 101a) and could determine the identity of the current user (e.g., by calling PsGetCurrentProcessId( ) in Windows or an equivalent function in other environments to identify the process ID of application 310 and then using the process ID to retrieve the username of the current user (e.g., by calling ZwOpenProcessTokenEx( ) or ZwOpenThreadTokenEx( ) and then calling ZwQueryInformationToken( ) to obtain the user SID)).

In step 3, upon receiving the device and/or user information, device control server 201 can employ the device and/or user information to retrieve an applicable policy from policies 201a. For example, if the user information indicates that the current user belongs to a particular group, device control server 201 can retrieve a policy that applies to users in the particular group and can then determine which access permissions for the particular type of device are allowed. As suggested above, a policy may be based on device characteristics alone, user characteristics alone, or a combination of device and user characteristics.

Figure 3B:
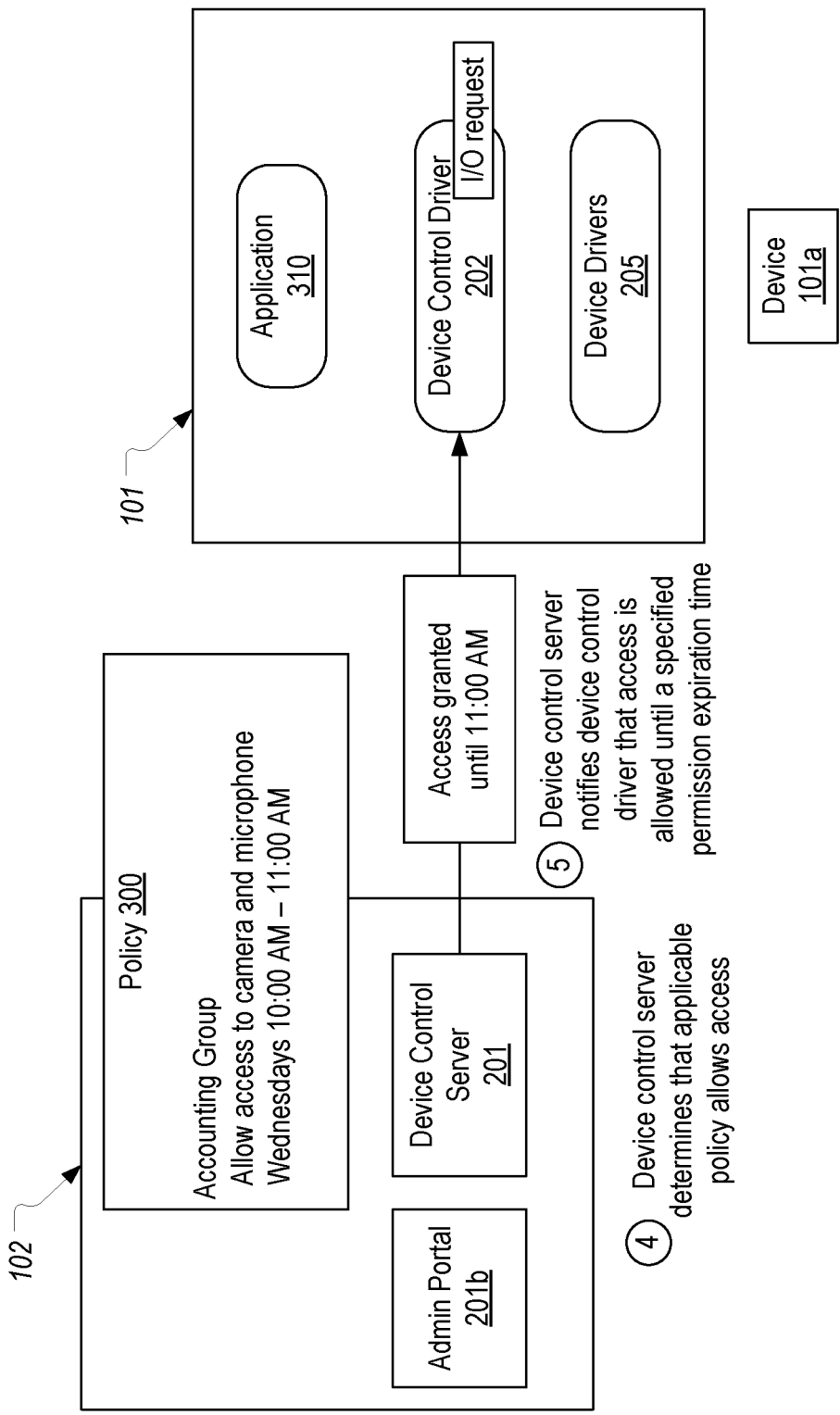

Turning now to FIG. 3B, for sake of illustration, it will be assumed that device control server 201 determines that a policy 300 applies to the current user's access to device 101a. For example, it will be assumed that the device and user information reported to device control server 201 indicate that device 101a is a camera and that the current user belongs to an accounting group. As shown, it will be assumed that policy 300 indicates that members of the accounting group should be allowed access to cameras and microphones on Wednesdays between 10:00 AM and 11:00 AM. Of course, this is just one example of a policy, and policies may be defined for many different combinations of criteria and at various levels of granularity. Based on policy 300 and assuming the request is received between 10:00 AM and 11:00 AM on a Wednesday, device control server 201 can determine, in step 4, that access to device 101a should be allowed.

In some embodiments, in addition to determining whether access should be allowed, device control server 201 can also determine how long access should be permitted. For example, in this case, device control server 201 can determine that policy 300 will allow access until 11:00 AM. Therefore, in step 5, device control server 201 can notify device control driver 202 that access to device 101a should be granted but only until the specified permission expiration time of 11:00 AM. Alternatively, if a policy does not explicitly define access windows, it may specify a default permission expiration time (e.g., 30 minutes) that applies to access permissions that fall under the policy or device control server 201 may itself specify a default permission expiration time that applies to any access permission for which the governing policy does not explicitly define a permission expiration time. In any case, when device control server 201 instructs device control driver 202 to allow access, this instruction may include an indication of when device control driver 202 should automatically revoke access. This will prevent a user from retaining access indefinitely.

Figure 3C:
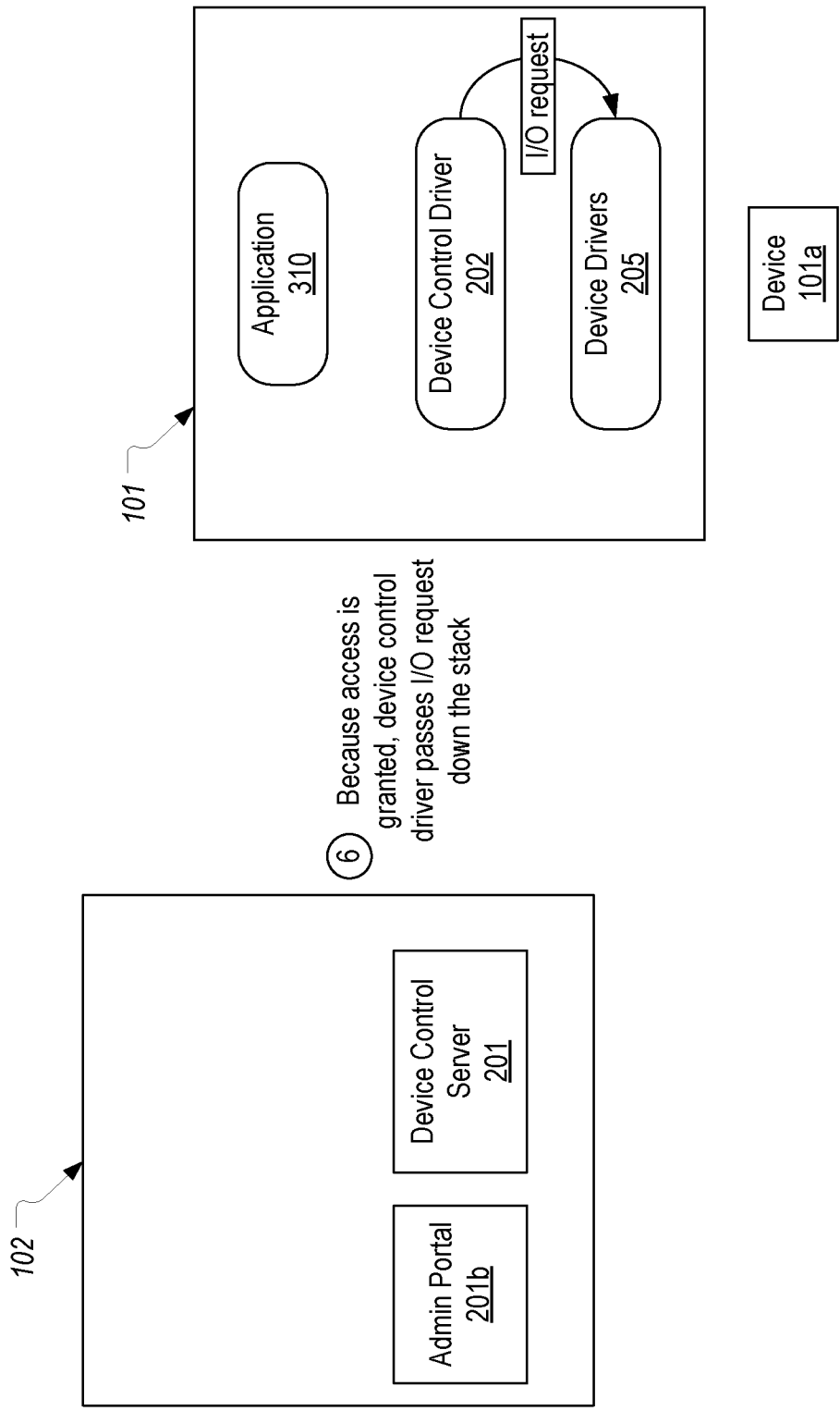

Turning to FIG. 3C, in step 6, because device control server 201 indicated that access to device 101a should be allowed, device control driver 202 can pass the I/O request down the stack to device drivers 205 which will ultimately deliver the I/O request to device 101a. Although not shown, any subsequent I/O requests that device control driver 202 receives prior to the specified permission expiration time (which would be 11:00 AM in this example) will also be passed down. Device 101a will therefore be accessible to the user based on the dynamic granting of access.

This approach can enable an administrator to dynamically control when certain types of devices can be accessed by certain users (and possibly from certain applications). For example, computing device 101 may represent a smart display in a conference room to which a webcam (device 101a) is attached. If an accounting team uses the conference room to host a virtual meeting every Wednesday from 10:00 AM to 11:00 AM, the administrator can use the techniques of the present invention to allow members of the accounting team to access the webcam only during these meetings. With the present invention, the administrator can accomplish this limiting of access to the one hour window without needing to reconfigure the smart display before and after each meeting. Instead, device control driver 202, which will be loaded whenever device 101a is connected, can dynamically determine whether access should be allowed. Different policies (or policy settings) could be defined to allow users of another group to only access the webcam during a different window again without requiring the administrator to repeatedly configure the smart display. The present invention therefore greatly facilitates device access management at a high level of customization.

In the above example, it was assumed that device control driver 202 would not determine whether access to device 101a should be allowed until it received an I/O request targeting the device. This can be viewed as on-demand determination of access permissions. In other embodiments, however, device control driver 202 could be configured to determine whether access should be allowed prior to receiving any I/O requests. For example, upon being loaded on the device driver stack (as opposed to in response to receiving an I/O request), device control driver 202 may communicate with device control server 201 to determine whether access should be allowed. In either case, the end result would be the same—device control driver 202 can identify whether and for how long access should be allowed by communicating with device control server 201.

It is noted that, in some cases such as when device 101*a* is redirected to VDI server 103, it may be necessary to evaluate individual I/O requests to determine whether they were generated by a user/application that has been granted access. For example, when device 101*a* is redirected to VDI server 103, it may be redirected in a manner that allows it to be accessed from other users' remote sessions. In the context of the same example used above, the smart display may function as a thin client in which case the attached webcam may be redirected to VDI server 103. If other remote sessions are running on VDI server 103 and session level isolation is not implemented, the webcam would be accessible within the other remote sessions. In such a case, when device control driver 202 is notified that access should be granted to a particular user, device control driver 202 can selectively pass I/O requests down the stack that were generated by the particular user while blocking I/O requests that were generated by other users. This selective blocking of I/O requests could be accomplished by identifying a session identifier associated with the I/O request. Of course, if session level isolation is applied to the redirected device, this type of selective blocking will not be necessary.

Figure 3D:
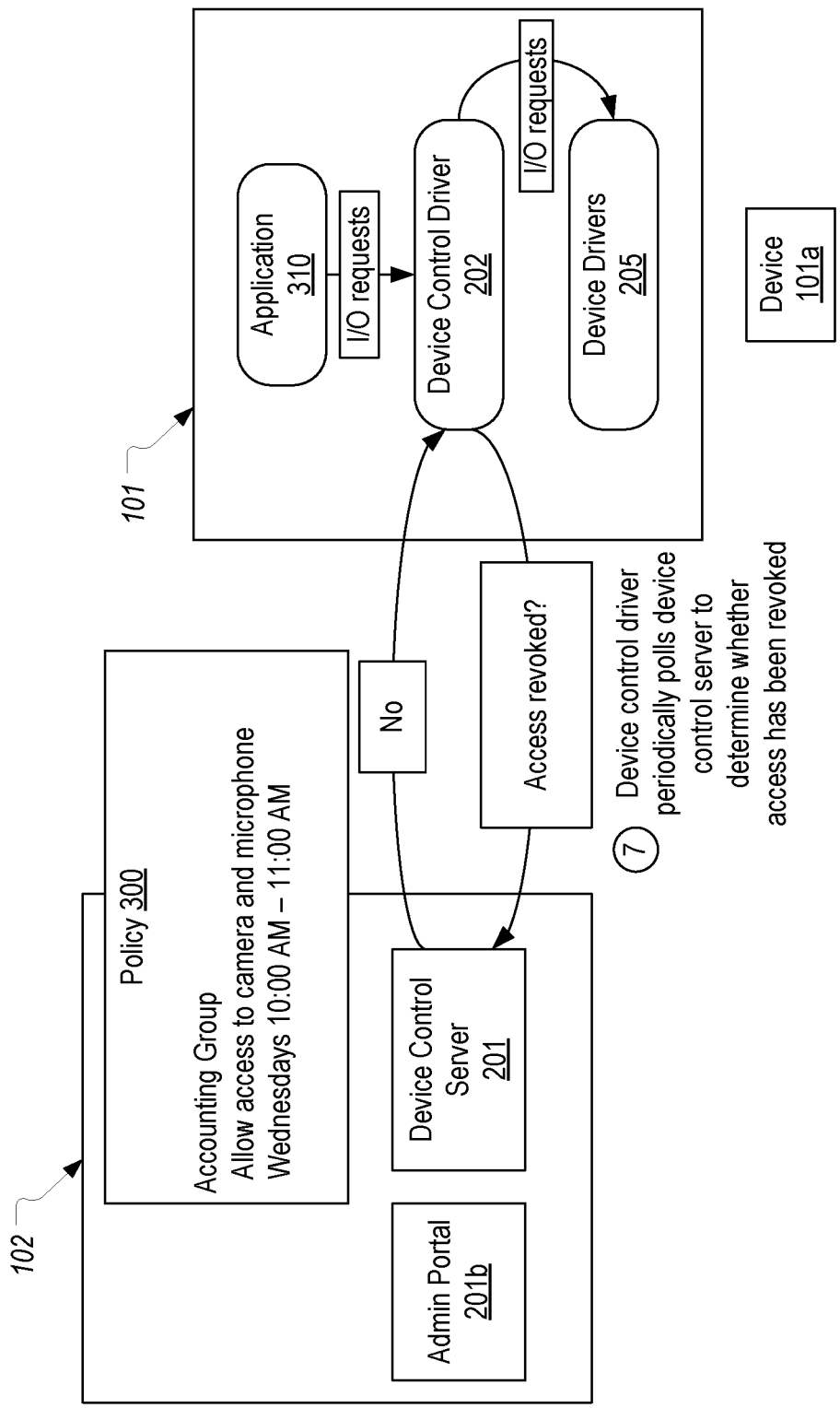

In some embodiments, once it has determined that access should be allowed, device control driver 202 can periodically poll device control server 201 to determine whether any changes have been made to the access permissions for device 101*a*. For example, in step 7 shown in FIG. 3D, device control driver 202 is shown as communicating with device control server 201 to determine whether access has been revoked. This polling can be performed at any suitable interval such as every five minutes. In FIG. 3D, it will be assumed that access has not been revoked and therefore device control driver 202 can continue to allow access to device 101*a* until the permission expiration time has been reached.

Figure 3E:
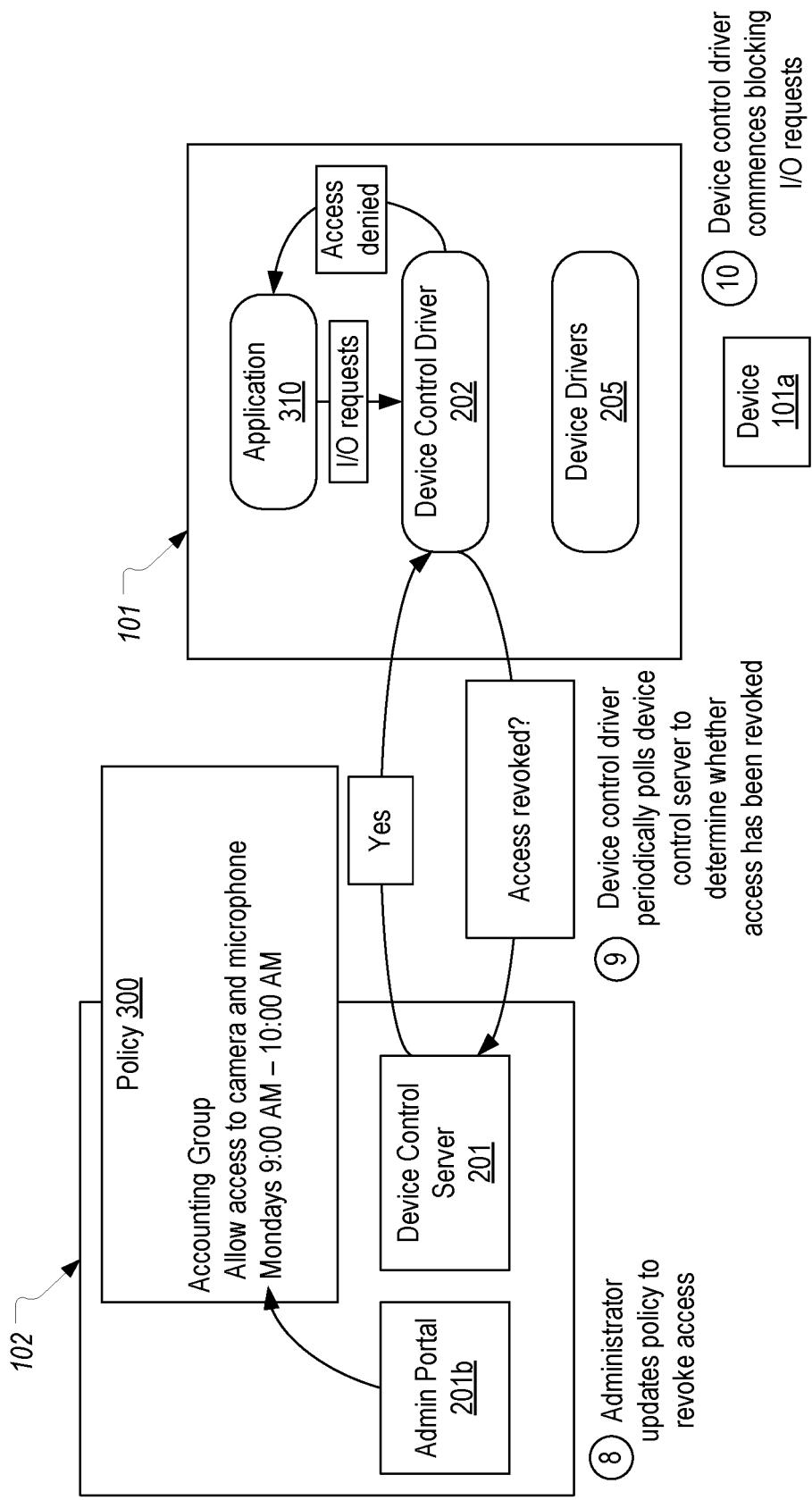

In contrast, in FIG. 3E, it will be assumed that an administrator has revoked access to device 101*a* in step 8. FIG. 3E depicts that the administrator accomplishes this by modifying policy 300 to change when the accounting group is allowed access. However, access may be revoked in many other ways. For example, the administrator may delete policy 300 altogether which would remove the basis for which access was granted. Alternatively, the administrator may expressly revoke the current access permissions without modifying the governing policy (e.g., by instructing device control server 201 to inform device control driver 202 that access has been revoked). In any of these cases, it will be assumed that access is revoked prior to reaching the permission expiration time that was specified when granting access (e.g., access is revoked prior to 11:00 AM). In this scenario, when device control driver 202 next polls device control server 201, device control server 201 can respond that access has been revoked as represented in step 9. In response, and as represented in step 10, device control driver 202 can block access to device 101*a* (e.g., by failing I/O requests that target device 101*a*). In some embodiments, device control server 201 can be configured to immediately notify device control driver 202 when access has been revoked (as opposed to waiting until the next polling cycle).

Admin portal 201*b* can provide an interface by which an administrator can define and update policies 201*a*. Admin portal 201*b* may also provide an interface by which an administrator can view any current access permissions that device control server 201 has provided to any instances of device control driver 202. In some embodiments, this interface may also allow an administrator to directly control device control server 201 such as by instructing device control server 201 to grant or revoke access to a particular device (e.g., by overriding the applicable policy). In short, admin portal 201*b* can allow an administrator to control functionality of management server 102.

In some embodiments, device control driver 202 can be configured to request that a user authenticate prior to initiating the process of determining whether access to device 101*a* should be allowed. In the examples given above, it has been assumed that the user has been logged in to computing device 101 such that device control driver 202 will be able to retrieve an identifier of the user. However, this may not always be the case such as when computing device 101 does not require the user to login to a domain (e.g., when computing device 101 has a generic login). In such situations, prior to step 2 of FIG. 3A, device control driver 202 can prompt the user to input appropriate credentials (e.g., the user's domain credentials). Device control driver 202 may then include these credentials with the device and user info sent to device control server 201 or may interface directly with an authentication service to authenticate the user prior to sending the device and user info to device control server 201. In this way, device control driver 202 can ensure that the current user can be identified so that device control server 201 can select the appropriate policy to apply.

Figure 4:
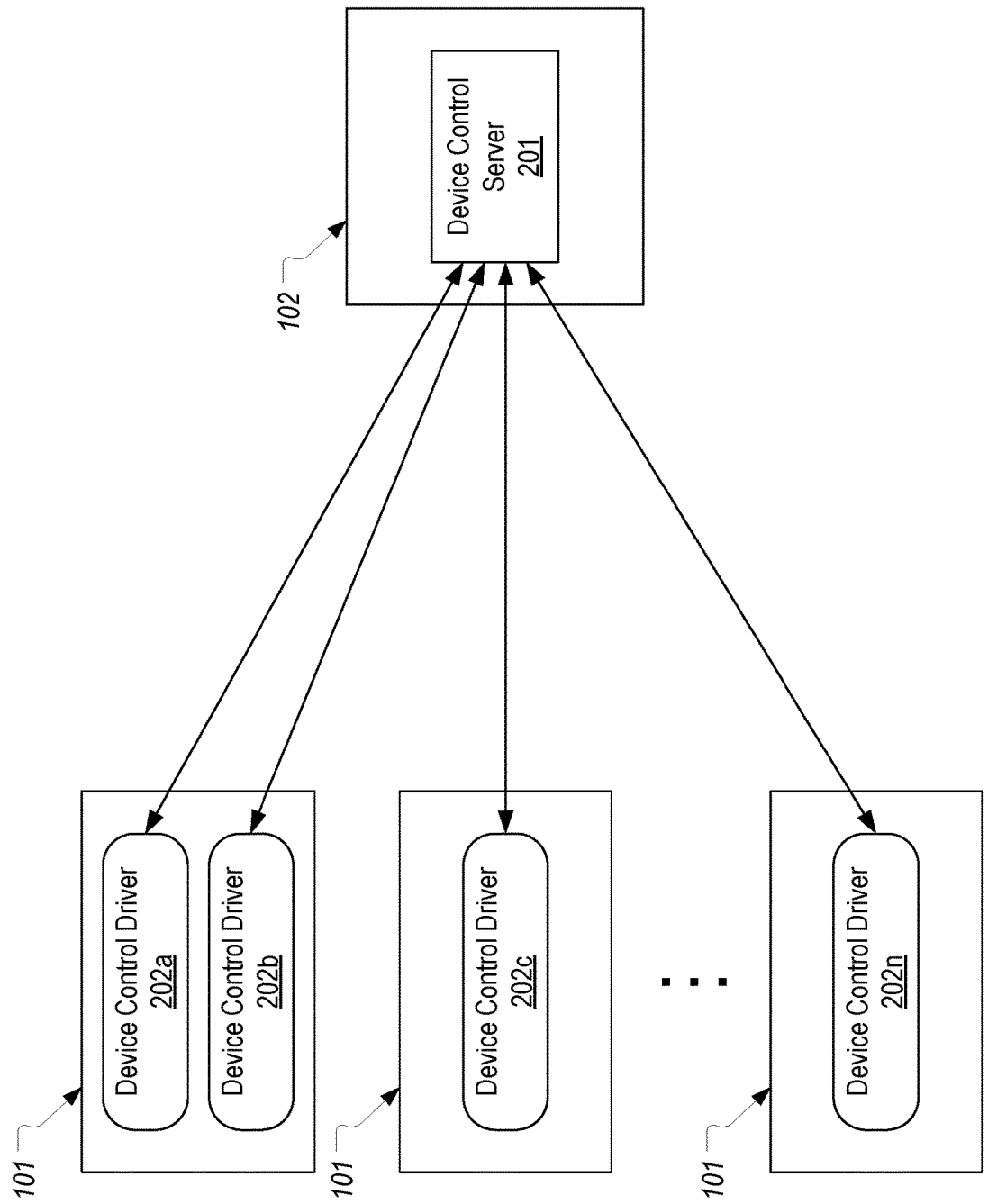
FIG. 4 illustrates how a device control server can specify access permissions for a number of device control drivers on a number of computing devices.

For sake of clarity, FIG. 4 illustrates that a single device control server 201 hosted on management server 102 (which can represent one or more computing devices) can interface with a number of instances of device control driver 202*a*-202*n* (where n can represent any integer). Additionally, FIG. 4 shows that multiple instances of device control driver (202*a* and 202*b*) can be loaded on the same computing device. Such may be the case when it is desired to control access to two separate devices that are connected to computing device 101 (or that are onboard devices) since each device would have its own device driver stack. In short, an instance of device control driver 202 can be loaded into the device driver stack for any type of device for which an administrator desires to control access.

Figure 5:
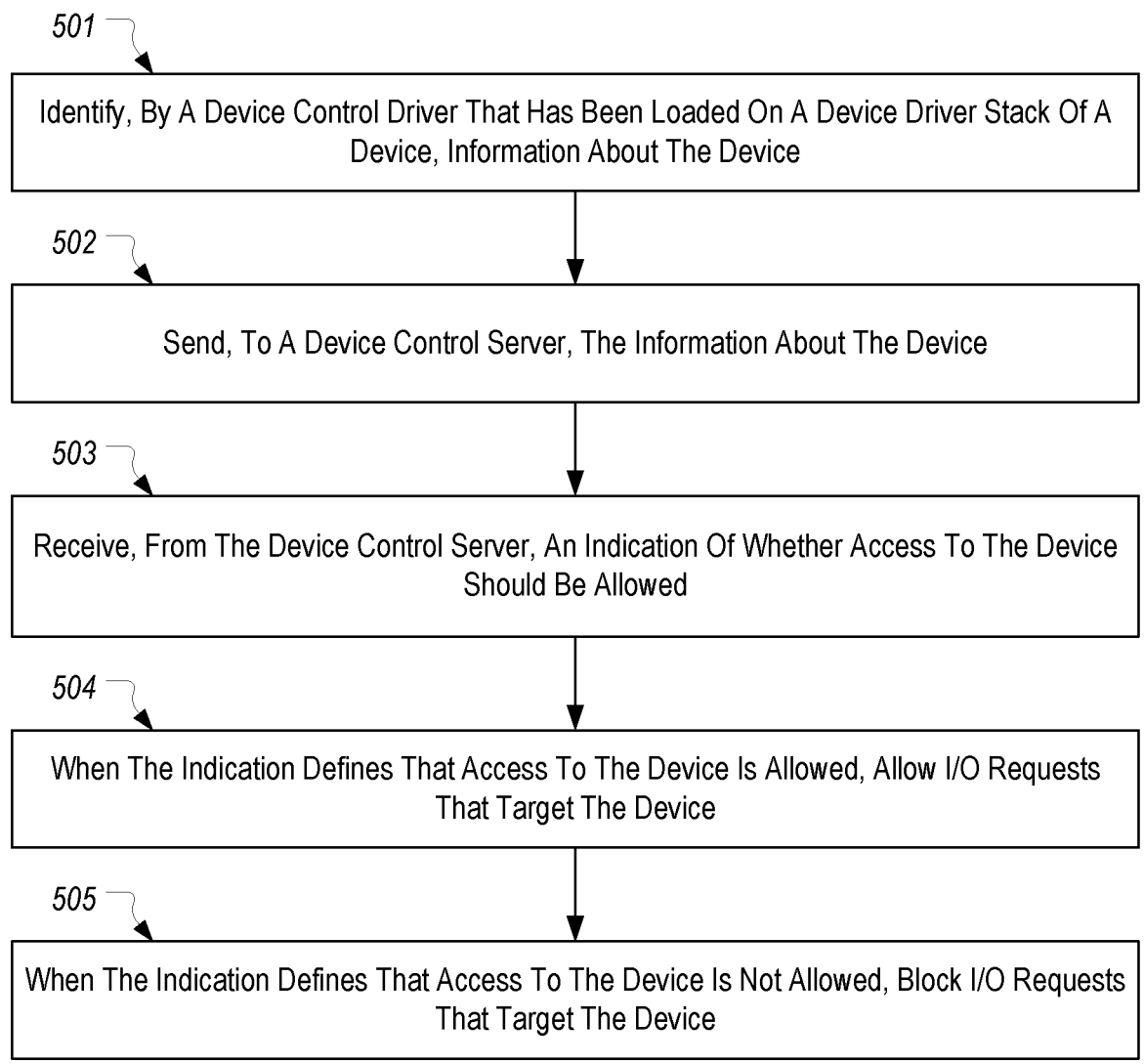
FIG. 5 illustrates a flowchart of a method for dynamically controlling access to a device.

FIG. 5 provides a flowchart of an example method 500 for dynamically controlling access to a device. As an example, method 500 can be performed by an instance of device control driver 202 that is loaded on a device driver stack on computing device 101 or on VDI server 103.

Method 500 includes an act 501 of identifying, by a device control driver that has been loaded on a device driver stack of a device, information about the device. For example, device control driver 202 could identify a type of device 101*a* and/or various characteristics about device 101*a* (e.g., USB descriptors or whether device 101*a* is an externally connected or onboard device).

Method 500 includes an act 502 of sending, to a device control server, the information about the device. For example, device control driver 202 can send information about device 101*a* to device control server 201.

Method 500 includes an act 503 of receiving, from the device control server, an indication of whether access to the device should be allowed. For example, device control driver 202 can receive a notification from device control server 201 indicating whether access to device 101*a* should be allowed.

Method 500 includes an act 504 of, when the indication defines that access to the device is allowed, allowing I/O requests that target the device. For example, device control driver 202 can allow application 310 to access device 101*a*.

Method 500 includes an act 505 of, when the indication defines that access to the device is not allowed, blocking I/O requests that target the device. For example, device control driver 202 can block application 310 from accessing device 101*a*.

Embodiments of the present invention may comprise or utilize special purpose or general-purpose computers including computer hardware, such as, for example, one or more processors and system memory. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media is categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similarly storage medium which can be used to store desired program code means in the form of computer-executable instructions or data structures and which can be accessed by a general purpose or special purpose computer. Transmission media include signals and carrier waves.

Computer-executable instructions comprise, for example, instructions and data which, when executed by a processor, cause a general purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present invention can be hosted in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A method, performed by a device control driver that is loaded on a computing device as an upper filter driver on a device driver stack of a device, for dynamically controlling access to the device, the method comprising:
   in response to the device being connected to the computing device and in conjunction with the device driver stack of the device being loaded on the computing device, loading, by the device control driver, as an upper filter driver on the device driver stack;
   identifying, by the device control driver, information about the device;
   sending, by the device control driver, the information about the device to a device control server to request that the device control server provide an indication of whether applications executing on the computing device should be allowed to access the device;
   receiving, by the device control driver and from the device control server, the indication of whether the applications executing on the computing device should be allowed to access the device;
   when the indication defines that the applications executing on the computing device should be allowed to access the device and in response to intercepting I/O requests that are generated by the applications and that target the device, allowing, by the device control driver, the I/O requests by passing the I/O requests down the device driver stack; and
   when the indication defines that the applications executing on the computing device should not be allowed to access the device and in response to intercepting I/O requests that are generated by the applications and that target the device, blocking, by the device control driver, the I/O requests by preventing the I/O requests from being passed down the device driver stack.

2. The method of claim 1, wherein the information about the device includes an identification of a type of the device.

3. The method of claim 1, wherein the device control driver also identifies and sends information about a current user with the information about the device.

4. The method of claim 1, wherein the indication defines that the applications executing on the computing device should be allowed to access the device and includes a permission expiration time.

5. The method of claim 1, wherein the device control driver intercepts the I/O requests before a function driver in the device driver stack receives the I/O requests.

6. The method of claim 1, wherein preventing the I/O requests from being passed down the device driver stack comprises failing the I/O requests.

7. The method of claim 1, further comprising:
   polling the device control server to determine whether a change in access permissions to the device has occurred.

8. The method of claim 1, wherein the device control driver sends the information about the device in response to intercepting an I/O request that targets the device.

9. A method, performed by a device control server in conjunction with a device control driver that is loaded on a computing device as an upper filter driver on a device driver stack for a device, for dynamically controlling access to a device, the method comprising:
   receiving, at the device control server, information about the device, the device being connected to or onboard a computing device, the information being received from the device control driver that is loaded on the computing device as an upper filter driver on the device driver stack for the device, the device driver stack being loaded on the computing device;

based on the received information, identifying a policy governing access permissions to the device;

evaluating the policy to determine whether applications executing on the computing device should be allowed to access the device;

when the policy indicates that the applications executing on the computing device should be allowed to access the device, sending a notification to the device control driver that instructs the device control driver to pass I/O requests generated by the applications down the device driver stack when the device control driver intercepts the I/O requests; and when the policy indicates that the applications executing on the computing device should be allowed to access the device, sending a notification to the device control driver that instructs the device control driver to prevent I/O requests generated by the applications from being passed down the device driver stack when the device control driver intercepts the I/O requests.

10. The method of claim 9, wherein the received information identifies a type of the device.

11. The method of claim 9, wherein the received information also identifies a current user of the computing device.

12. The method of claim 9, wherein evaluating the policy to determine whether the applications executing on the computing device should be allowed to access the device further includes:

when it is determined that the applications executing on the computing device should be allowed to access the device, determining a permission expiration time defining when the applications executing on the computing device should no longer be allowed to access the device.

13. The method of claim 9, wherein the device control driver sends the notification that instructs the device control driver to allow the applications executing on the computing device to access the device until a permission expiration time has been reached, the method further comprising:

prior to the permission expiration time being reached, receiving, from the device control driver, a polling request;

in response to the polling request, determining that the applications executing on the computing device should no longer be allowed to access the device; and sending a notification to instruct the device control driver to block the applications executing on the computing device from accessing the device.

14. The method of claim 13, wherein determining that the applications executing on the computing device should no longer be allowed to access the device comprises:

determining that the policy has been changed to no longer allow the applications executing on the computing device to access the device.

15. The method of claim 9, wherein evaluating the policy to determine whether the applications executing on the computing device should be allowed to access the device comprises one or more of:

determining whether the policy dictates that a current user can access the device; or determining whether the policy dictates that access to the device should be allowed at a time when the information about the device is received.

16. The method of claim 9, wherein the information about the device includes information about a current user of the computing device, and wherein evaluating the policy to determine whether the applications executing on the computing device should be allowed to access the device comprises evaluating whether the policy dictates that the current user is allowed to access the device at a time when the information is received.

17. One or more computer storage media storing computer-executable instructions which when executed on one or more processors of a computing device implement a method for controlling access to a device, the method comprising:

in response to the device being connected to the computing device and in conjunction with a device driver stack of the device being loaded on the computing device, loading, by a device control driver, as an upper filter driver on the device driver stack;

identifying, by the device control driver, information about the device;

sending, by the device control driver, the information about the device to a device control server to request that the device control server provide an indication of whether applications executing on the computing device should be allowed to access the device;

employing, by the device control server, the information about the device to identify a policy governing access to the device;

evaluating, by the device control server, the policy to determine whether the applications executing on the computing device should be allowed to access the device;

sending, by the device control server, a notification to the device control driver that identifies whether the device control driver should allow the applications executing on the computing device to access the device;

when the notification identifies that the applications executing on the computing device should be allowed to access the device and in response to intercepting I/O requests that are generated by the applications and that target the device, allowing, by the device control driver, the I/O requests by passing the I/O requests down the device driver stack; and when the notification identifies that the applications executing on the computing device should not be allowed to access the device and in response to intercepting I/O requests that are generated by the applications and that target the device, blocking, by the device control driver, the I/O requests by preventing the I/O requests from being passed down the device driver stack.

18. The computer storage media of claim 17, wherein the information about the device includes information about a current user of the computing device.

19. The computer storage media of claim 18, wherein evaluating the policy to determine whether the applications executing on the computing device should be allowed to access the device comprises determining that the policy dictates that the current user is allowed to access the device at a time when the information is received.

20. The computer storage media of claim 19, wherein the notification that identifies that the applications executing on the computing device should be allowed to access the device also instructs the device control driver to allow the applications executing on the computing device to access the device until a permission expiration time has been reached.

* * * * *